Aug. 22, 1950     D. S. BARLOW     2,519,425
ALTERNATING CURRENT CONTROL DEVICE
Filed Feb. 26, 1948     2 Sheets-Sheet 1

INVENTOR
D. S. BARLOW
BY
P. C. Smith
ATTORNEY

Aug. 22, 1950     D. S. BARLOW     2,519,425
ALTERNATING CURRENT CONTROL DEVICE
Filed Feb. 26, 1948     2 Sheets-Sheet 2

INVENTOR
D. S. BARLOW
BY P. C. Smith
ATTORNEY

Patented Aug. 22, 1950

2,519,425

UNITED STATES PATENT OFFICE 2,519,425

ALTERNATING CURRENT CONTROL DEVICE

Dick S. Barlow, Port Washington, N. Y., assignor to Bell Telephone Laboratories, Incorporated, New York, N. Y., a corporation of New York Application February 26, 1948, Serial No. 10,945

15 Claims. (Cl. 323—56)

This invention relates to alternating current control devices and particularly to alternating current transmission controllers having no moving parts. The invention, in certain respects, comprises an improvement in similar devices proposed by D. W. Grant in his application, Serial No. 11,007, filed February 26, 1948, and patented concurrently herewith. In other respects the invention comprises entirely novel subject-matter as will be disclosed and claimed hereinafter.

The Grant disclosure, above-identified, discloses and claims an alternating current control device comprising a magnetizable core having two alternating current windings so disposed on said core that normally there is no electromagnetic coupling between these two windings when one of them is energized. A third winding is arranged on said core and energizable by unidirectional current. When the third winding is so energized the unidirectional electromagnetic flux produced thereby in said core effects electromagnetic coupling between said two alternating current windings without linking the alternating current windings. Grant accomplishes this switch action control of the alternating current transmission without necessitating any intentional permanent magnetic bias in the core structure and relies upon core construction and winding disposition thereon for the results obtained.

Grant further discloses and claims a similar device wherein, according to one embodiment, two or more control windings are used and which are supplied out of phase with each other from the alternating current output winding to effect a feedback control. This out-of-phase feedback arrangement, after a control current is used to create initial coupling, enables continuous coupling control after the initial control energization is removed from one or both of the control windings.

In arrangements similar to those of Grant's it will be appreciated that the normally decoupled condition of the alternating current windings is created by a magnetic balance in a plural-legged core. Unidirectional current may be used to saturate one or more legs to thereby upset the core balance and force the aforementioned coupling. It will be apparent that the necessary feedback current required to maintain continuous coupling must be of comparable magnitude to the initial unidirectional saturating current. Since the alternating current frequency may increase or decrease, the effective alternating current impedance of the control windings will increase and decrease therewith. Thus, as the input frequency rises, more and more output voltage will be required to create saturating current in the control windings. This situation requires high voltage insulation which in turn generally dictates a costly arrangement.

One object of the present invention is to interpose in the feedback path, above mentioned, a frequency reducing network, which may be capable of reducing the frequency of output current to a lower frequency relative to the input frequency or even to unidirectional current before the feedback current traverses the control windings. By this means the necessary feedback voltage will not need to be as high as in such arrangements as are shown in the Grant disclosure, above referred to, which disclosure may be considered as part of the disclosure herein for a more complete understanding of such devices. Thus excessively high voltages are not necessary and the structures referred to may exist in smaller, more compact and less expensive form, while at the same time affording substantially comparable results.

Another object of the invention, of more general scope than improvement of the Grant type of device, is the arrangement whereby the above discussed type of switch action control device may be controlled continuously by a feedback circuit requiring only a single control winding but of course permitting more if desired, as will be explained. This arrangement is characterized by the presence in the feedback circuit of a rectifier as the frequency reducer. A plurality of control windings is not necessary if the feedback current is rectified since there need be no phase displacement thereof to effect continued saturation of the variable reluctance core leg or legs used to upset the core balance. The rectified current will need to be produced by a voltage comparable only with the magnitude of initial unidirectional voltage used to initially create coupling. As before a structure is realized which is smaller, more compact and less expensive than the split-phase feedback arrangement wherein alternating current impedances necessitate higher voltages.

The foregoing discussion will be more fully appreciated from an understanding of the following detailed specification which describes certain exemplary embodiments of this invention. The following specification makes reference to the drawing forming a part thereof, general descriptions of the various figures of said drawing being as follows.

Figure 1:
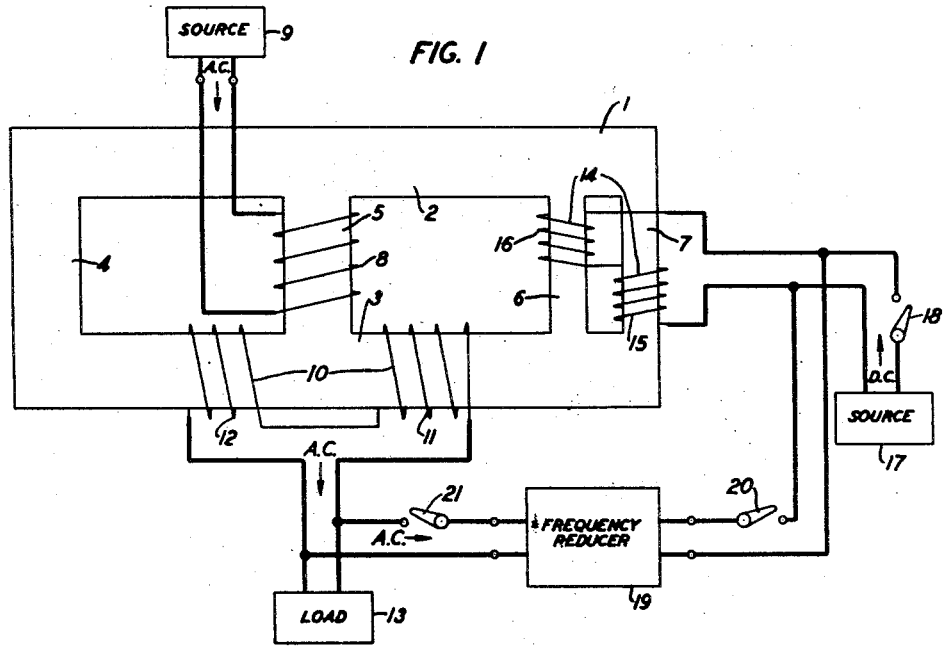
Fig. 1 shows a control device embodying a frequency reducer according to the present invention.

Referring to Fig. 1, a magnetizable core, generally referred to by numeral 1, comprises two main arms or legs 2 and 3 joined by four auxiliary arms or legs 4, 5, 6 and 7 in parallel magnetic circuits. On leg 5 is arranged an alternating current winding 8, which, in the particular embodiment shown, comprises the primary or input winding supplied by a source 9 of alternating current. A winding 10, composed of two portions 11 and 12, is arranged on main arm or leg 3 of core 1 such that any voltages induced in portions 11 and 12 by equal fluxes produced by winding 8 and linking said portions will cancel each other such that effectively therefrom there will be no resultant voltage induced in winding 10 as a whole. Winding 10, in this embodiment, comprises the secondary or output winding which may energize a load 13. Of course the windings 8 and 10 may be reversed as to their functioning as primary (input) and secondary (output) windings for successful use of this invention.

A third winding 14, comprising two portions 15 and 16, is disposed on core legs 6 and 7 such that any voltages induced in portions 15 and 16 by equal fluxes linking them in the same direction will cancel each other so that no resultant voltage will be induced thereby in winding 14 as a whole. Winding 14 may be supplied by unidirectional current from a source 17 thereof under control of switch 18. In the subsequent description source 17 is considered as of direct current; however, other momentarily unidirectional current is satisfactory for the purposes to be described.

As described in the aforementioned Grant disclosure, normally, when winding 14 is not energized sufficiently to saturate one or both of core legs 6 and 7, the permeability or reluctance of core legs 6 and 7 in parallel is substantially equal to that of leg 4. This core balance, with the indicated disposition of windings on core 1, will normally results in no net coupling between windings 8 and 10. When winding 14 is energized to saturate legs 6 and 7, the permeability of the parallel path changes to upset the normal core balance, thereby to effectively couple windings 8 and 10 electromagnetically. Disposition of all windings such that the respective axes are mutually perpendicular will help to insure zero normal coupling but is not necessary since essentially all of the flux paths will be confined to the magnetic core.

In accordance with the present invention a frequency reducer 19 is supplied with part of the output winding energy under control of switch 21 and the output of the frequency reducer 19 is supplied to the control winding 14 under control of switch 20. If the frequency reducer is considered as a rectifier, as it must be in Fig. 1, either to produce a unidirectional current or a smooth form thereof called direct current, it will be appreciated that by this means continuous coupling control may be effected by winding 14 after the initial energization provided by source 17 is removed, such as by the opening of switch 18. Thereafter, the coupling may be destroyed by merely opening either switch 20, switch 21 or both, not to mention opening of the circuit of either the input winding 8 or the output winding 10.

Figure 2:
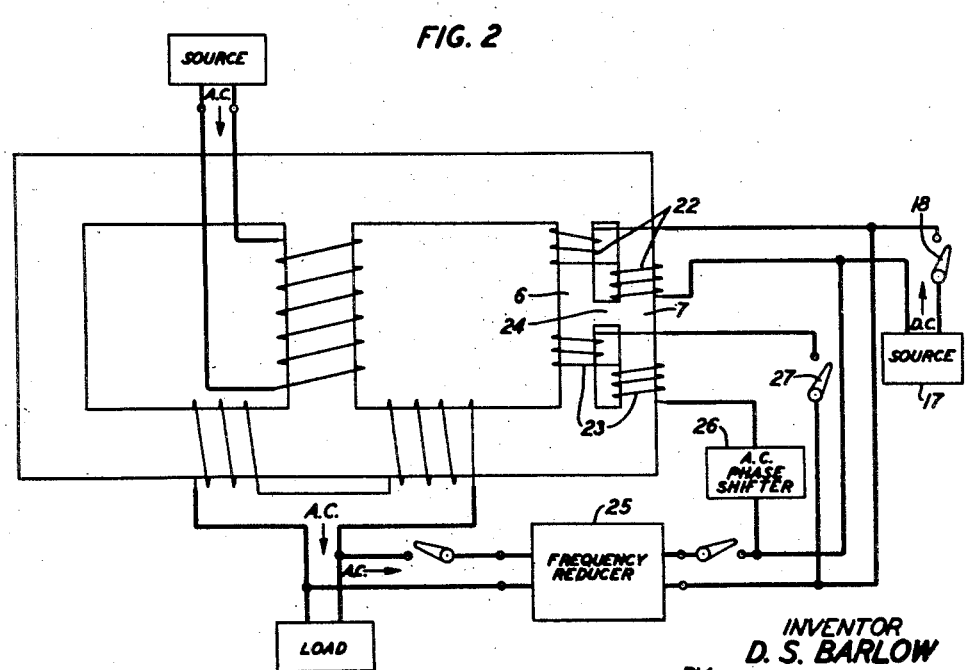
Fig. 2 shows another form of control device modified by the frequency reduction which characterizes this invention.

Referring to Fig. 2, two control windings 22 and 23 are arranged on legs 6 and 7, which legs are joined substantially at the respective midsections thereof by a core portion 24. A frequency reducer 25 is used in the feedback circuit, its function being to reduce the alternating current frequency to a lower frequency than the output frequency but not to such an extent as to produce a unidirectional current. Of course, as explained in connection with Fig. 1, the frequency reducer 25 of Fig. 2 may be a rectifier for under this condition Fig. 2 will function as well as Fig. 1. Fig. 2 is primarily shown and described as follows to bring out the advantage of reducing frequency but not to rectification limits. A phase shifter 26, such as a condenser or other well-known phase shifting means, is interposed in the feedback circuit of one winding, such as winding 23. Since the two control windings 22 and 23 are supplied by alternating currents out of phase with each other it will be appreciated that any instant it may be arranged that one or the other of said windings will saturate either or both of legs 6 and 7 to thereby create continuous coupling control within core 1. Again a control current source 17 may be used to initiate the control by means of a switch 18.

Figure 3:
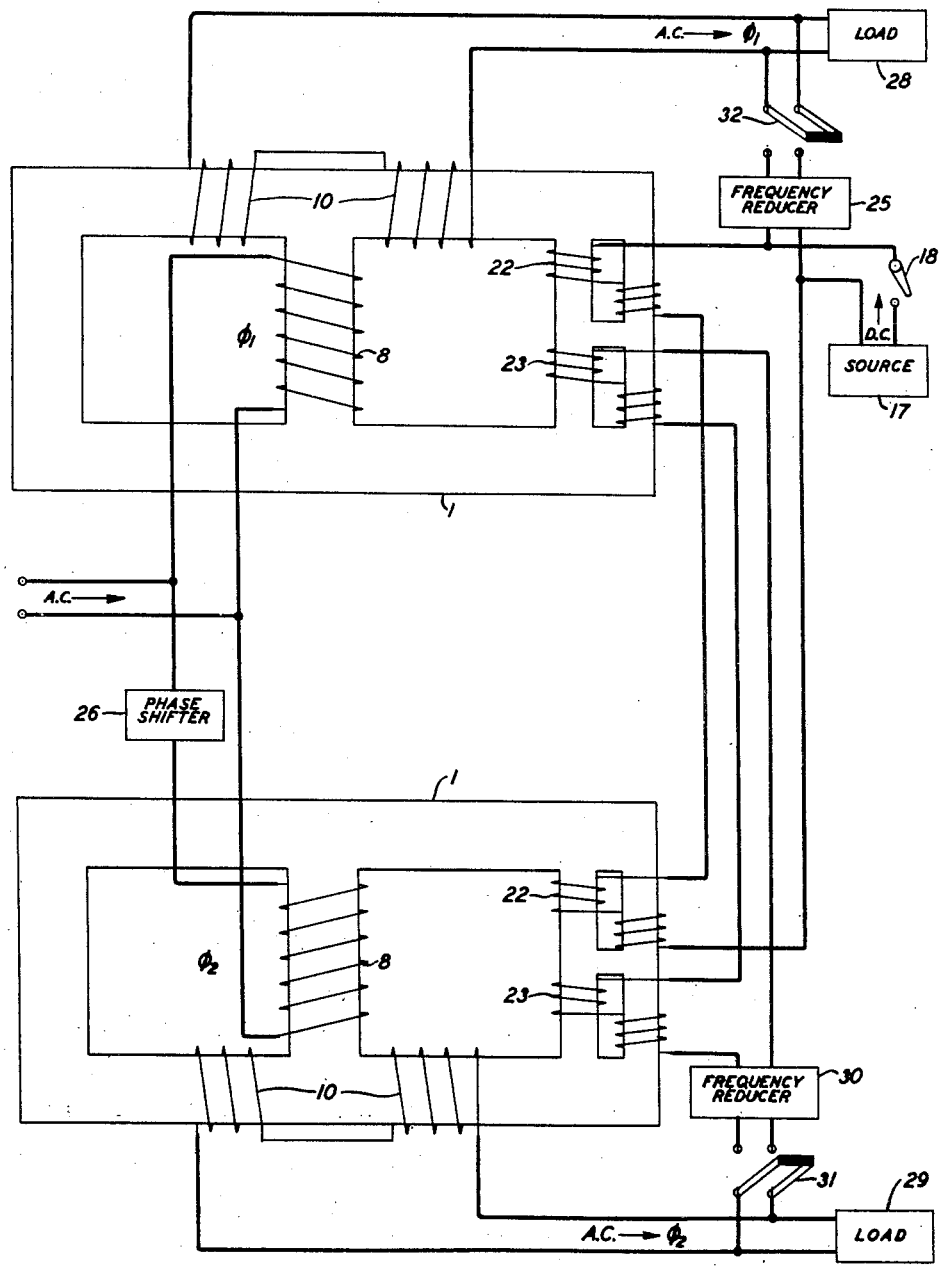
Fig. 3 shows a modification of the split-phase feedback arrangement of Fig. 2.

Fig. 3 shows a rearrangement of the continuous feedback control previously discussed with regard to Fig. 2. Two cores 1 are shown, each having two control windings 22 and 23, an input winding 8 and an output winding 10.

The phase shifter 26 is interposed in circuit with one of the input windings 8 in this modification instead of being in circuit with the control winding energization paths. The output currents of the two cores 1 are out of phase in this arrangement, this being represented by an output of phase 1, $\phi_1$, at the top supplying a load 28 and an output of phase 2, $\phi_2$, at the bottom of Fig. 3 supplying a load 29. Each phase energizes one of the two control windings, such as 22 for $\phi_1$, on each core 1 through a frequency reducing means 25 and the other phase energizes the other control winding, such as 23 for $\phi_2$, through another frequency reducing means 30. Switches such as 31 and 32 again control the energization of the control windings 22 and 23. A unidirectional or other control current source 17 is again necessary to initiate the coupling control by means of a switch 18.

Of course more than two separate cores 1 may be used in accordance with the arrangement of Fig. 3. If three were used, there would of course need be only two control windings for each core as previously; however, three such windings for each core could be successfully employed, if desired. It is also to be understood that a number of different sources may be connectable to a single load or many loads by means of this plural core arrangement.

With reference to Fig. 2, it will be appreciated that the switch 27 in the coil circuit of winding 23 may be left open to enable a rectifier, acting as frequency reducer 25, to effect the feedback control as in the embodiment of Fig. 1. However, as previously explained a rectifier in place of frequency reducer 25 would effect an operative circuit irrespeceive of the condition of switch 27.

By means of frequency reduction in the feedback control circuit it is possible to operate these devices at fairly low voltages since the impedance of such as windings 14 of Fig. 1, and 22 and 23 of Figs. 2 and 3 will be lower for lower frequencies, thus requiring lower voltages as driving forces for the necessary magnitudes of control currents comparable with that initially required from source 17. The possibility of being able to successfully employ lower voltages enables the obvious advantages of smaller, more compact and less expensive structures than, for instance, those necessitated by the disclosures of Grant above, wherein no frequency reduction is contemplated.

The devices proposed as exemplary of the present invention suggest certain analogies to previously known devices such as alternating current relays with holding windings and such as gas-discharge tubes wherein a control electrode enables the discharge to take place and wherein the control electrode is not necessary to a sustained discharge, when one started thereby. It appears that such uses as are known for such devices may also be practical for devices embodying the present invention.

It is also to be understood, as previously mentioned, that it is fully within the scope of the present invention to utilize separate sources of alternating current and separate loads where plural core arrangements are used. It will be understood that when such is the case, and alternating current control is used, at least two control windings must be used as herein described and the currents in said windings must be made to have different phase with respect to each other; but, of course, no such phase angle control is necessary if rectified control current is employed.

In regard to various types of frequency-reducing networks or circuits which may be utilized in the practice of this invention, in addition to rectifiers which may supply unidirectional current (either of varying amplitude or constant amplitude, such as direct current) such circuits as are disclosed and suggested in the following patents of C. P. Stocker are satisfactory: 2,088,618, 2,088,619, and 2,088,620, issued August 3, 1937, or 2,179,386, issued November 7, 1939. Also as will be appreciated by those skilled in the art, combinations of rotary machines may be used to produce the necessary frequency reduction.

It is not intended that the disclosure herein of certain exemplary embodiments of the invention shall limit the scope of said invention. Claims are appended which alone define the scope of this invention.

What is claimed is:

1. An alternating current control device comprising a magnetizable core, a first alternating current winding on said core, a second alternating current winding on said core and so disposed thereon that normally said alternating current windings are not electromagnetically coupled when said first winding is energized, a plurality of additional windings on said core, at least one of said additional windings so disposed on said core that when same is initially energized the electromagnetic flux produced thereby in said core will effect electromagnetic coupling between said alternating current windings, and a frequency reducer, at least two of said additional windings energizable out of phase with each other through said frequency reducer by said second alternating current winding, after said coupling has been effected, to effect continued electromagnetic coupling therebetween when said initial energization is removed from said one additional winding.

2. An alternating current control device comprising a magnetizable core, a first alternating current winding on said core, a second alternating current winding on said core and so disposed thereon that normally said alternating current windings are not electromagnetically coupled when said first winding is energized, a plurality of additional windings on said core, one of said additional windings so disposed on said core that when same is initially energized the electromagnetic flux produced thereby in said core will effect electromagnetic coupling between said alternating current windings, and a frequency reducer, said one additional winding and one other of said additional windings energizable out of phase with each other through said frequency reducer by said second alternating current winding, after said coupling has been effected, to effect continued electromagnetic coupling therebetween when said initial energization is removed from said one additional winding.

3. An alternating current control device comprising a magnetizable core, a first alternating current winding on said core, a second alternating current winding on said core and so disposed thereon that normally said alternating current windings are not electromagnetically coupled when said first winding is energized, two additional windings on said core, one of said additional windings so disposed on said core that when same is initially energized the electromagnetic flux produced thereby in said core will effect electromagentic coupling between said alternating current windings, and a frequency reducer, said one additional winding and the other of said additional windings energizable out of phase with each other through said frequency reducer by said second alternating current winding, after said coupling has been effected to effect continued electromagnetic coupling therebetween when said initial energization is removed from said one additional winding.

4. An alternating current control device comprising a magnetizable core, a first alternating current winding on said core, a second alternating current winding on said core and so disposed thereon that normally said alternating current windings are not electromagnetically coupled when said first winding is energized, two additional windings on said core, one of said additional windings so disposed on said core that when same is initially energized the electromagnetic flux produced thereby in said core will effect electromagnetic coupling between said alternating current windings, and a frequency reducer, said one additional winding and the other of said additional windings energizable out of phase with each other through said frequency reducer by said second alternating current winding, after said coupling has been effected, to effect continued electromagnetic coupling therebetween when said initial energization is removed from said one additional winding, one of said additional windings being energized directly by said frequency reducer and the other of said additional windings being energized by said frequency reducer through a phase shifter.

5. An alternating current control device comprising a plurality of separate magnetizable cores, each core carrying a first alternating current winding and a second alternating current winding so disposed on said core that normally said first and second windings are not electromagnetically coupled when said first winding is energized, a third winding so disposed on at least one of said cores that when same is initially energized the electromagnetic flux produced thereby in said one core will effect electromagnetic coupling between said alternating current windings of said one core, winding means on others of said cores energizable by said second alternating current winding of said one core, after said coupling has been effected therein, to effect electromagnetic coupling between alternating current windings of others of said cores, and rectifying means, said winding means energizable through said rectifying means by said second alternating current windings of said cores, wherein said coupling has been effected, to effect continued electromagnetic coupling between alternating current windings of each of said cores when said initial energization is removed from said third winding.

6. An alternating current control device comprising two separate magnetizable cores, each core carrying a first alternating current winding and a second alternating current winding so disposed on said core that normally said two windings are not electromagnetically coupled when said first winding is energized, a third winding so disposed on at least one of said two cores that when same is initially energized the electromagnetic flux produced thereby in said one core will effect electromagnetic coupling between said alternating current windings of said one core, winding means on the second of said two cores energizable by said second alternating current winding of said one core, after said coupling has been effected therein, to effect electromagnetic coupling between alternating current windings of said second core, and rectifying means, said winding means energizable through said rectifying means by said second alternating current windings of said two cores to effect continued electromagnetic coupling between alternating current windings of both of said two cores when said initial energization is removed from said third winding.

7. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between alternating current windings of said one core, winding means on others of said cores energizable by said second alternating current winding of said one core, after said coupling has been effected therein, to effect electromagnetic coupling between alternating current windings of others of said cores, frequency reducing means, and additional winding means on each of said cores, wherein said coupling has been effected, energizable through said frequency reducing means by said second alternating current windings of each of said cores, wherein said coupling has been effected, out of phase with the energization supplied from others of said cores to effect continued electromagnetic coupling between alternating current windings of each of said cores when said initial energization is removed from said third winding.

8. An alternating current control device comprising a plurality of separate magnetizable cores, each core carrying a first alternating current winding and a second alternating current winding so disposed on said core that normally said first and said second windings are not electromagnetically coupled when said first winding is energized, each of said first alternating current windings being energizable out of phase with others of said first alternating current windings, a third winding so disposed on at least one of said cores that when same is initially energized the electromagnetic flux produced thereby in said one core will effect electromagnetic coupling between said alternating current windings of said one core, winding means on others of said cores energizable by said second alternating current winding of said one core, after said coupling has been effected therein, to effect electromagnetic coupling between alternating current windings of others of said cores, frequency reducing means, and winding means on each of said cores, wherein said coupling has been effected, energizable through said frequency reducing means by said second alternating current windings of each of said cores, wherein said coupling has been effected, to effect continued eletromagnetic coupling between said coupled alternating current windings of said cores when said initial energization is removed from said third winding.

9. An alternating current control device comprising two separate magnetizable cores, each core carrying a first alternating current winding and a second alternating current winding so disposed on said core that normally said two windings are not electromagnetically coupled when said first winding is energized, a third winding so disposed on at least one of said two cores that when same is initially energized the electromagnetic flux produced thereby in said one core will effect electromagnetic coupling between said alternating current windings of said one core, winding means on the second of said two cores energizable by said second alternating current winding of said one core, after said coupling has been effected therein, to effect electromagnetic coupling between alternating current windings of said second core, frequency reducing means, and additional winding means on each of said cores energizable through said frequency reducing means by said second alternating current windings of each of said cores out of phase with the energization supplied by the other of said cores to effect continued electromagnetic coupling between alternating current windings of both cores when said initial energization is removed from said third winding.

10. An alternating current control device comprising two separate magnetizable cores, each core carrying a first alternating current winding and a second alternating current winding so disposed on said core that normally said two windings are not electromagnetically coupled when said first winding is energized, said first windings of said two cores being energizable out of phase with each other, a third winding so disposed on at least one of said two cores that when same is initially energized the electromagnetic flux produced thereby in said one core will effect electromagnetic coupling between said alternating current windings of said one core, winding means on the second of said two cores energizable by said second alternating current winding of said one core, after said coupling has been effected therein, to effect electromagnetic coupling between alternating current windings of said second core, frequency reducing means, and additional winding means on each of said cores energizable through said frequency reducing means by said second alternating current windings of each of said cores to effect continued electromagnetic coupling between alternating current windings of both cores when said initial energization is removed from said third winding.

11. An alternating current control device comprising two separate magnetizable cores, each core carrying a first alternating current winding and a second alternating current winding so disposed on said core that normally said two windings are not electromagnetically coupled when said first winding is energized, said first windings of said two cores being energizable in phase with each other, a third winding so disposed on at least one of said two cores that when same is initially energized the electromagnetic flux produced thereby in said one core will effect electromagnetic coupling between said alternating current windings of said one core, winding means on the second of said two cores energizable by said second alternating current winding of said one core, after said coupling has been effected therein, to effect electromagnetic coupling between alternating current windings of said second core, frequency reducing means, and additional winding means on each of said cores energizable through said frequency reducing means by said second alternating current windings of each of said cores out of phase with the energization supplied from the other of said core to effect continued electromagnetic coupling between alternating current windings of both cores when said initial energization is removed from said third winding.

12. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between alternating current windings of said one core, and winding means on others of said cores energizable by said second alternating current winding of said one core, after said coupling has been effected therein, to effect electromagnetic coupling between alternating current windings of others of said cores, said means energizable by said second alternating current windings of each of said cores, wherein said coupling has been effected, to effect continued electromagnetic coupling between alternating current windings of each of said cores when said initial energization is removed from said third winding.

13. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between alternating current windings of said one core, winding means on others of said cores energizable by said second alternating current winding of said one core, after said coupling has been effected therein, to effect electromagnetic coupling between alternating current windings of others of said cores, and additional winding means on each of said cores, wherein said coupling has been effected, energizable by said second alternating current windings of each of said cores, wherein said coupling has been effected, to effect continued electromagnetic coupling between alternating current windings of each of said cores when said initial energization is removed from said third winding.

14. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between alternating current windings of said one core, winding means on others of said cores energizable by said second alternating current winding of said one core, after said coupling has been effected therein, to effect electromagnetic coupling between alternating current windings of others of said cores, and frequency reducing means, said winding means energizable through said frequency reducing means by said second alternating current windings of each of said cores, wherein said coupling has been effected, to effect continued electromagnetic coupling between alternating current windings of each of said cores when said initial energization is removed from said third winding.

15. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between alternating current windings of said one core, winding means on others of said cores energizable by said second alternating current winding of said one core, after said coupling has been effected therein, to effect electromagnetic coupling between alternating current windings of others of said cores, frequency reducing means, and additional winding means on each of said cores, wherein said coupling has been effected, energizable through said frequency reducing means by said second alternating current windings of each of said cores, wherein said coupling has been effected, to effect continued electromagnetic coupling between alternating current windings of each of said cores when said initial energization is removed from said third winding.

DICK S. BARLOW.

REFERENCES CITED

The following references are of record in the file of this patent:

UNITED STATES PATENTS

| Number | Name | Date |
| --- | --- | --- |
| 1,793,213 | Dowling | Feb. 17, 1931 |
| 1,862,204 | Sorensen | June 7, 1932 |

FOREIGN PATENTS

| Number | Country | Date |
| --- | --- | --- |
| 291,101 | Great Britain | Nov. 22, 1929 |
| 501,431 | France | Apr. 14, 1920 |